(12) United States Patent
Zhou (10) Patent No.: US 11,796,427 B2
(45) Date of Patent: Oct. 24, 2023

(54) ROTATING DIRECTION CHANGE DEVICE FOR MICROTOME

(71) Applicant: Leica Microsystems Ltd., Shanghai, Shanghai (CN)

(72) Inventor: Gang Zhou, Shanghai (CN)

(73) Assignee: Leica Microsystems Ltd., Shanghai, Shanghai (CN)

( * ) Notice: Subject to any disclaimer, the term of this patent is extended or adjusted under 35 U.S.C. 154(b) by 547 days.

(21) Appl. No.: 16/650,880

(22) PCT Filed: Sep. 29, 2017

(86) PCT No.: PCT/CN2017/104211
§ 371 (c)(1),
(2) Date: Mar. 26, 2020

(87) PCT Pub. No.: WO2019/061225
PCT Pub. Date: Apr. 4, 2019

(65) Prior Publication Data
US 2020/0225123 A1 Jul. 16, 2020

(51) Int. Cl.
*F16H 3/40* (2006.01)
*G01N 1/06* (2006.01)
*F16H 3/34* (2006.01)

(52) U.S. Cl.
CPC ............... *G01N 1/06* (2013.01); *F16H 3/34* (2013.01); *F16H 3/40* (2013.01); *G01N 2001/065* (2013.01)

(58) Field of Classification Search
CPC ................ F16H 3/34; F16H 3/40; G01N 1/06
See application file for complete search history.

(56) References Cited

U.S. PATENT DOCUMENTS

| 2,354,987 A | * | 8/1944 | Fawkes | ................... F16K 31/50 74/625 |
| 3,638,974 A | * | 2/1972 | Stratienko | ............... F16D 1/094 403/370 |
| 5,020,386 A | * | 6/1991 | Taig | ......................... F16H 3/40 74/354 |
| 5,663,804 A | | 9/1997 | Kataoka et al. | |
| 7,900,545 B2 | | 3/2011 | Schneider | |

(Continued)

FOREIGN PATENT DOCUMENTS

| CN | 202218889 U | 5/2012 |
| CN | 104416609 A | 3/2015 |

(Continued)

*Primary Examiner* — William C Joyce
(74) *Attorney, Agent, or Firm* — Hodgson Russ LLP (57) ABSTRACT

A rotating direction change device for a microtome includes: a first shaft arranged in a first fixed position; a first gear wheel non-rotatably mounted to the first shaft; a second shaft movable in a first direction; a second gear wheel non-rotatably mounted to the second shaft; a third shaft movable in a second direction; a third gear wheel non-rotatably mounted to the third shaft; and a first connection part connecting the second shaft and the third shaft such that the second gear wheel is constantly meshed with the third gear wheel, in which the second gear wheel can be driven by the first gear wheel directly or indirectly. Hence, the rotating direction change device has advantages of simple structure and low friction.

15 Claims, 9 Drawing Sheets

(56) References Cited

U.S. PATENT DOCUMENTS

| | | | |
|---|---|---|---|
| 7,966,917 | B2 | 6/2011 | Schneider |
| 10,502,259 | B2 * | 12/2019 | Meyer .................... F16C 17/26 |
| 2012/0060664 | A1 | 3/2012 | Ha |
| 2015/0047464 | A1 | 2/2015 | Fan et al. |

FOREIGN PATENT DOCUMENTS

| | | |
|---|---|---|
| CN | 105114552 A | 12/2015 |
| JP | H09242843 A | 9/1997 |
| JP | 2002156008 A | 5/2002 |
| JP | 2002276771 A | 9/2002 |
| JP | 2015038478 A | 2/2015 |

\* cited by examiner

ROTATING DIRECTION CHANGE DEVICE FOR MICROTOME

CROSS-REFERENCE TO RELATED APPLICATION

The present application is a national phase entry under 35 USC § 371 of International Application PCT/CN2017/104211, filed Sep. 29, 2017, the entire disclosure of which is incorporated herein by reference.

FIELD

The present disclosure relates to a technical field of microtomes, in particular to a rotating direction change device for a microtome.

BACKGROUND

In a rotary microtome of a related art, a cutting unit is driven by rotating at least one handwheel. Some operators feel more comfortable to rotate the handwheel clockwise, while some others feel more comfortable to rotate the handwheel anticlockwise. Therefore, there are two kinds of microtomes on market, one handwheel of which needs to be rotated clockwise, while the other one needs to be rotated anticlockwise. Consumers have to choose one of the two options at the time of purchase. Technicians can change a rotating direction after the purchase only through large-scale and tedious modifications.

U.S. patent application publication number US2012060664A1 describes a microtome having a means for reversing a direction of rotation. The microtome has a first shaft which is mounted in a fixed position and capable of being driven by a handwheel and which has a first gear wheel non-rotatably mounted thereon. The microtome also includes a second shaft which is mounted in a fixed position and which has a second gear wheel non-rotatably mounted thereon. The first gear wheel and the second gear wheel are coupled to each other via a transmission unit, such that the second shaft can be driven by the first shaft. In a first position of the transmission unit, the two shafts are rotatable in the same direction, while in a second transmission position the two shafts are rotatable in opposite directions.

Chinese patent application publication number CN104416609A describes a microtome with a reverse device. The disclosure provides a microtome including a first shaft, a first gear wheel, a second shaft, a second gear wheel, a drive unit and a switching unit. The first shaft is mounted to a fixed position and can be driven by a handwheel. The first gear wheel is non-rotatably mounted to the first shaft. The second shaft is mounted to another fixed position. The second gear wheel is non-rotatably mounted to the second shaft, and the first gear wheel and the second gear wheel are connected to each other through the drive unit, such that the second shaft can be driven by the first shaft. The switching unit is configured to pivotally switch the drive unit between a first position and a second position. When the drive unit is in the first position, the first shaft and the second shaft rotate in the same direction, and when the drive unit is in the second position, the first shaft and the second shaft rotate in opposite directions. The drive unit includes a first intermediate gear and a second intermediate gear which are engaged with each other. In the first position, the two shafts are connected by one of the two intermediate gears, and in the second position, the two shafts are connected by the two intermediate gears.

U.S. Pat. No. 7,900,545B2 describes a crank drive system of a shaft of a microtome shaft, and the crank drive system includes a first shaft and a second shaft. The first shaft is rotatable with a crank and includes a first transfer gear wheel. The second shaft includes a second transfer gear wheel. The rotation of the first shaft is transferable from the first transfer gear wheel to the second transfer gear wheel in order to rotate the second shaft. To make possible, with a microtome, an advance or a lowering of the specimen in two respective oppositely directed rotation directions with the same crank drive system, the crank drive system is characterized in that a third transfer gear wheel is provided, and the first transfer gear wheel is selectably engageable with the second transfer gear wheel or with the third transfer gear wheel. Therefore, as a result, when the rotation direction of the second shaft is maintained, the rotation direction of the first shaft is reversible.

U.S. Pat. No. 7,966,917B2 describes a microtome having a lever arrangement, the lever arrangement for the microtome includes: a first lever and a second lever. The first lever is mounted rotatably about a first axis. The second lever is mounted rotatably about a second axis. One lever includes two guidance surfaces, and the other lever includes a guidance segment. The guidance segment coacts with the two guidance surfaces such that the rotation of the first lever in a first direction rotates the second lever in a target direction, and the rotation of the first lever in a direction opposite to the first direction rotates the second lever in the target direction.

The technical solutions of U.S. patent application publication number US2012060664A1 and Chinese patent application publication number CN104446609A require at least four gear wheels to transmit, resulting in high friction, and users need large torque to drive the transmission system. The crank drive system in U.S. Pat. No. 7,900,545B2 has a complex structure. U.S. Pat. No. 7,966,917B2 can only be used to change the rotation direction of the lever, and cannot be used to change the rotation direction of a shaft.

SUMMARY

The present disclosure intends to solve at least one of the technical problems in the related art to a certain extent. Hence, an objective of the present disclosure is to propose a rotating direction change device for a microtome, which has the advantages of simple structure and low friction.

According to one embodiment of the present disclosure, a rotating direction change device includes: a first shaft arranged in a first fixed position; a first gear wheel non-rotatably mounted to the first shaft; a second shaft movable in a first direction; a second gear wheel non-rotatably mounted to the second shaft; a third shaft movable in a second direction; a third gear wheel non-rotatably mounted to the third shaft; and a first connection part connecting the second shaft and the third shaft such that the second gear wheel is constantly meshed with the third gear wheel, in which the second gear wheel can be driven by the first gear wheel directly or indirectly.

In the rotating direction change device according to one embodiment of the present disclosure, by arranging the second shaft movable along the first direction and the third shaft movable along the second direction, as well as by connecting the second shaft and the third shaft through the first connection part, the rotating direction change device realizes two meshing positions, thereby changing the rotating direction. Therefore, the rotating direction change device has the advantages of simple structure, and low friction.

In addition, the rotating direction change device according to the above embodiment of the present disclosure may also have the following additional technical features.

According to one embodiment of the present disclosure, the rotating direction change device has a first meshing position and a second meshing position, when in the first meshing position, the third gear wheel is directly meshed with the first gear wheel, and the second gear wheel is indirectly meshed with the first gear wheel through the third gear wheel. When in the second meshing position, the third gear wheel is separated from the first gear wheel, and the second gear wheel is directly meshed with the first gear wheel.

According to one embodiment of the present disclosure, the first direction and the second direction are at a certain angle.

According to one embodiment of the present disclosure, the first direction is perpendicular to the second direction. Thus, interference between the movement of the second shaft and the movement of the third shaft is avoided.

According to one embodiment of the present disclosure, the first connection part is configured as a strip plate, and two through holes are defined in the first connection part and fitted with the second shaft and the third shaft respectively. The two through holes are at a preset distance such that the second gear wheel is constantly meshed with the third gear wheel. Hence, the first connection part has simple structure and is easy to process.

According to one embodiment of the present disclosure, the rotating direction change device further includes a base, the base defining a first hole, a first slot and a second slot, the first shaft is fitted in the first hole, the first slot extends in the first direction, the second shaft is movably fitted in the first slot, the second slot extends in the second direction and the third shaft is movably fitted in the second slot, which thus facilitates mounting each component.

According to one embodiment of the present disclosure, the rotating direction change device further includes a bearing, in which the first shaft is fitted in the first hole of the base through the bearing. Thus, the rotation accuracy of the first shaft is ensured.

According to one embodiment of the present disclosure, the rotating direction change device further includes a shaft sleeve fixedly fitted over the second shaft, in which the second gear wheel is non-rotatably mounted to the second shaft through the shaft sleeve. Hence, while the strength of the second shaft is strengthened, connection between the second shaft and the third shaft through the first connection part can be facilitated.

According to one embodiment of the present disclosure, the rotating direction change device further includes a handwheel connected to the first shaft. Therefore, user may operate the handwheel to drive the first shaft in different directions, such that the second shaft rotates in the same direction, which makes the operation flexible and improves use comfort.

According to one embodiment of the present disclosure, the rotating direction change device further includes a camshaft arranged in a second fixed position; a cam non-rotatably mounted to the camshaft, a center of the cam being offset from an axis of the camshaft; and a second connection part having a first end connected to the third shaft, and a second end engaged with the cam, in which the cam drives the third shaft to move in the second direction through the second connection part. Therefore, the rotating direction change device can be switched between the first meshing position and the second meshing position by operating the cam, and the operation torque of the user is small.

According to one embodiment of the present disclosure, the cam is configured as a circular plate, and has a first engagement surface and a second engagement surface opposite to each other in a radial direction, and a distance between the first engagement surface and the axis of the camshaft is smaller than a distance between the second engagement surface and the axis of the camshaft. Hence, the cam can define a first cam position and a second cam position, thereby further defining the first meshing position and the second meshing position of the rotating direction change device.

According to one embodiment of the present disclosure, the second connection part is configured as a strip plate, and has a mounting hole defined in a first end thereof, a flange formed at a second end thereof, and an accommodating slot defined between the mounting hole and the flange and extending in a length direction of the second connection part; an upper surface of the flange is configured to engage with the first engagement surface or the second engagement surface of the cam, the mounting hole is fitted with the third shaft, and the camshaft passes through the accommodating slot. Hence, the second connection part has a simple structure and is easy to process.

According to one embodiment of the present disclosure, the rotating direction change device further includes a base having a second hole therein, in which the camshaft is fitted in the second hole.

According to one embodiment of the present disclosure, the rotating direction change device further includes an elastic member having a first end arranged in a third fixed position, and a second end connected to the third shaft or connected to the first end of the second connection part. Hence, the elastic member acts on the second connection part, such that the second end of the second connection part is constantly meshed with the cam. Therefore, the cam can be maintained in the first cam position or the second cam position so as to prevent the cam from accidentally moving, and also to prevent the second shaft and the third shaft from accidentally moving.

According to one embodiment of the present disclosure, the rotating direction change device also includes a pin arranged in the third fixed position, in which the first end of the elastic member is fixed to the pin, which thus facilitates fixing of the elastic member.

According to one embodiment of the present disclosure, the rotating direction change device includes a rotating shaft movable linearly; a camshaft arranged in a first fixed position; a cam non-rotatably mounted to the camshaft, a center of the cam being offset from an axis of the camshaft; and a transmission part having a first end connected to the rotating shaft, and a second end engaged with the cam, in which the cam can drive the rotating shaft to move linearly through the transmission part.

In the rotating direction change device according to one embodiment of the present disclosure, the camshaft and the rotating shaft are connected by using the transmission part, such that the cam can drive the rotating shaft to move linearly through the transmission part. Thus, the user may operate the rotating direction change device through the cam, and the operation torque of the user is small.

According to one embodiment of the present disclosure, the cam is configured as a circular plate and has a first engagement surface and a second engagement surface opposite to each other in a radial direction. A distance between the first engagement surface and the axis of the camshaft is smaller than a distance between the second engagement surface and the axis of the camshaft. Therefore, the cam can define the first cam position and the second cam position.

According to one embodiment of the present disclosure, the transmission part is configured as a strip plate, and has a mounting hole defined in a first end thereof, a flange formed at a second end thereof, and an accommodating slot defined between the mounting hole and the flange and extending in a length direction of the transmission part. An upper surface of the flange is configured to engage with the first engagement surface or the second engagement surface of the cam, and the mounting hole is fitted with the rotating shaft, and the camshaft passes through the accommodating slot. Therefore, the second connection part has a simple structure and is easy to process.

According to one embodiment of the present disclosure, the rotating direction change device also includes an elastic member having a first end arranged in a second fixed position, and a second end of the elastic member connected to the rotating shaft or the first end of the transmission part. Hence, the elastic member acts on the second connection part, such that the second end of the second connection part is constantly meshed with the cam. Therefore, the cam in can be maintained the first cam position or the second cam position so as to prevent the cam from accidentally moving, and also to prevent the second shaft and the third shaft from accidentally moving.

According to one embodiment of the present disclosure, the rotating direction change device also includes a pin arranged in the second fixed position, in which the first end of the elastic member is fixed to the pin, which thus facilitates fixing of the elastic member.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

Other aspects and advantages of the present disclosure are described below, which are explained in more detail with reference to the accompanying drawings based on embodiments.

DETAILED DESCRIPTION

The preferred embodiments of the present disclosure are described below with reference to the accompanying drawings. It should be noted that the terms "up", "down", "left", "right", "front", "rear" and similar expressions used herein are only for the purpose of explanation, not for the limitation of the present disclosure.

In FIGS. 1-9, the orthogonal XYZ axes are illustrated for convenience of description and determining a direction. A positive direction of X axis is a forward direction and a negative direction of X axis is a backward direction. A positive direction of Y axis is a right direction and a negative direction of Y axis is a left direction (the left-and-right direction is an example of a first direction). A positive direction of Z axis is an up direction and a negative direction of Z axis is a down direction (the up-and-down direction is an example of a second direction).

The present disclosure relates to a rotating direction change device for a microtome which includes: a first shaft arranged in a first fixed position; a first gear wheel non-rotatably mounted to the first shaft; a second shaft movable in the first direction; a second gear wheel non-rotatably mounted to the second shaft; a third shaft movable in the second direction; a third gear wheel non-rotatably mounted to the third shaft, and a first connection part. The first connection part connects the second shaft and the third shaft, such that the second gear wheel is constantly meshed with the third gear wheel. The second gear wheel can be driven by the first gear wheel directly or indirectly.

A rotating direction change device 100 according to one embodiment of the present disclosure will be described below with reference to the accompanying drawings.

Figure 1:
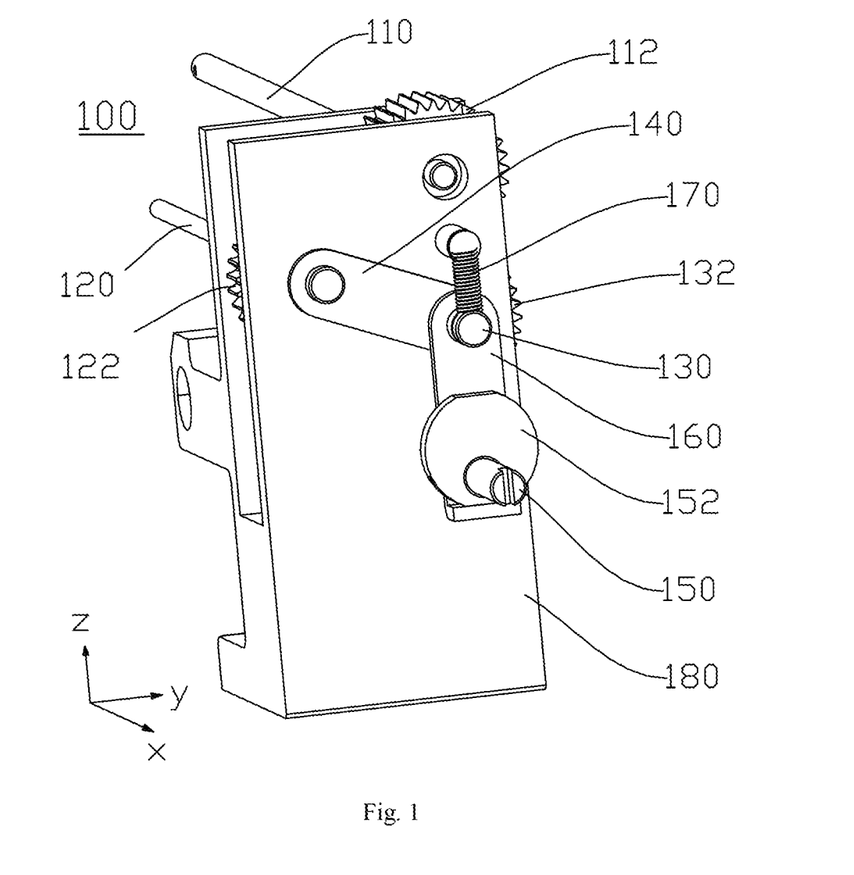
FIG. 1 is a perspective view of a rotating direction change device in a first meshing position according to one embodiment of the present disclosure.

FIG. 1 shows a perspective view of a rotating direction change device 100 in a first meshing position according to one embodiment of the present disclosure. The rotating direction change device 100 includes an input shaft 110 (as an example of a first shaft), an output shaft 120 (as an example of a second shaft), an intermediate shaft 130 (as an example of a third shaft), and a first connection part 140. The input shaft 110 has a first gear wheel 112 non-rotatably mounted to the input shaft 110, and the output shaft 120 has a second gear wheel 122 non-rotatably mounted to the output shaft 120. The intermediate shaft 130 has a third gear wheel 132 non-rotatably mounted to the intermediate shaft 130. A position of the input shaft 110 is fixed, the output shaft 120 is movable in the left-and-right direction, and the intermediate shaft 130 is movable in the up-and-down direction. The first connection part 140 is used to connect the output shaft 120 and the intermediate shaft 130. The first connection part 140 is rotatable relative to the output shaft 120 and the intermediate shaft 130 respectively, such that the second gear wheel 122 and the third gear wheel 132 are constantly meshed. Thus, the second gear wheel 122 can be driven by the first gear wheel 112 directly or indirectly.

It should be noted that in this description, the term "a position is fixed" refers to that the part is arranged in a fixed position and cannot be moved. In addition, according to requirement, the fixed positions of different parts in this description may be different or the same.

Although as illustrated in FIG. 1, the first direction is perpendicular to the second direction, it should be understood by those skilled in the related art that the first direction may not be perpendicular to the second direction, and that is, there is a certain angle between the first direction and the second direction.

The rotating direction change device 100 may also include a camshaft 150 and a second connection part 160. The camshaft 150 has a cam 152 non-rotatably mounted to the camshaft 150, and a center of the cam 152 is offset from an axis of the camshaft 150. A position of the camshaft 150 is fixed. A first end of the second connection part 160 is connected to the intermediate shaft 130, and a second end of the second connection part 160 is engaged with the cam 152 on the camshaft 150, such that the cam 152 of the camshaft 150 can drive the intermediate shaft 130 to move in the up-and-down direction through the second connection part 160. The cam 152 has a first cam position and a second cam position. The first cam position and the second cam position may be switched to each other by rotating the cam 152 through a certain angle, such that the rotating direction change device 100 may switch between the first meshing position and the second meshing position. As illustrated in FIG. 1, the cam 152 is in the first cam position and the rotating direction change device 100 is correspondingly in the first meshing position.

The rotating direction change device 100 may also include an elastic member 170. A position of a first end of the elastic member 170 is fixed, and a second end thereof is connected to the intermediate shaft 130, such that the elastic member 170 acts on the second connection part 160, such that the second end of the second connection part 160 is constantly engaged with the cam 152. That is, the cam 152 is maintained in the first cam position or the second cam position so as to prevent the cam 152 from accidentally moving, and also to prevent the output shaft 120 and the intermediate shaft 130 from accidentally moving. Although the second end of the elastic member 170 illustrated in FIG. 1 is connected to the intermediate shaft 130, it should be understood by those skilled in the related art that the second end of the elastic member 170 may also be connected to other positions. For example, the second end of the elastic member 170 may be connected to the first end of the second connecting member 160.

The rotating direction change device 100 may also include a base 180. The input shaft 110 is mounted to the base 180 and the position thereof is fixed. The output shaft 120 is mounted to the base 180 and is movable in the left-and-right direction relative to the base 180. The intermediate shaft 130 is mounted to the base 180 and is movable in the up-and-down direction relative to the base 180. The camshaft 150 is mounted to the base 180 and the position thereof is fixed, and the first end of the elastic part 170 is fixedly connected to the base 180.

Figure 2:
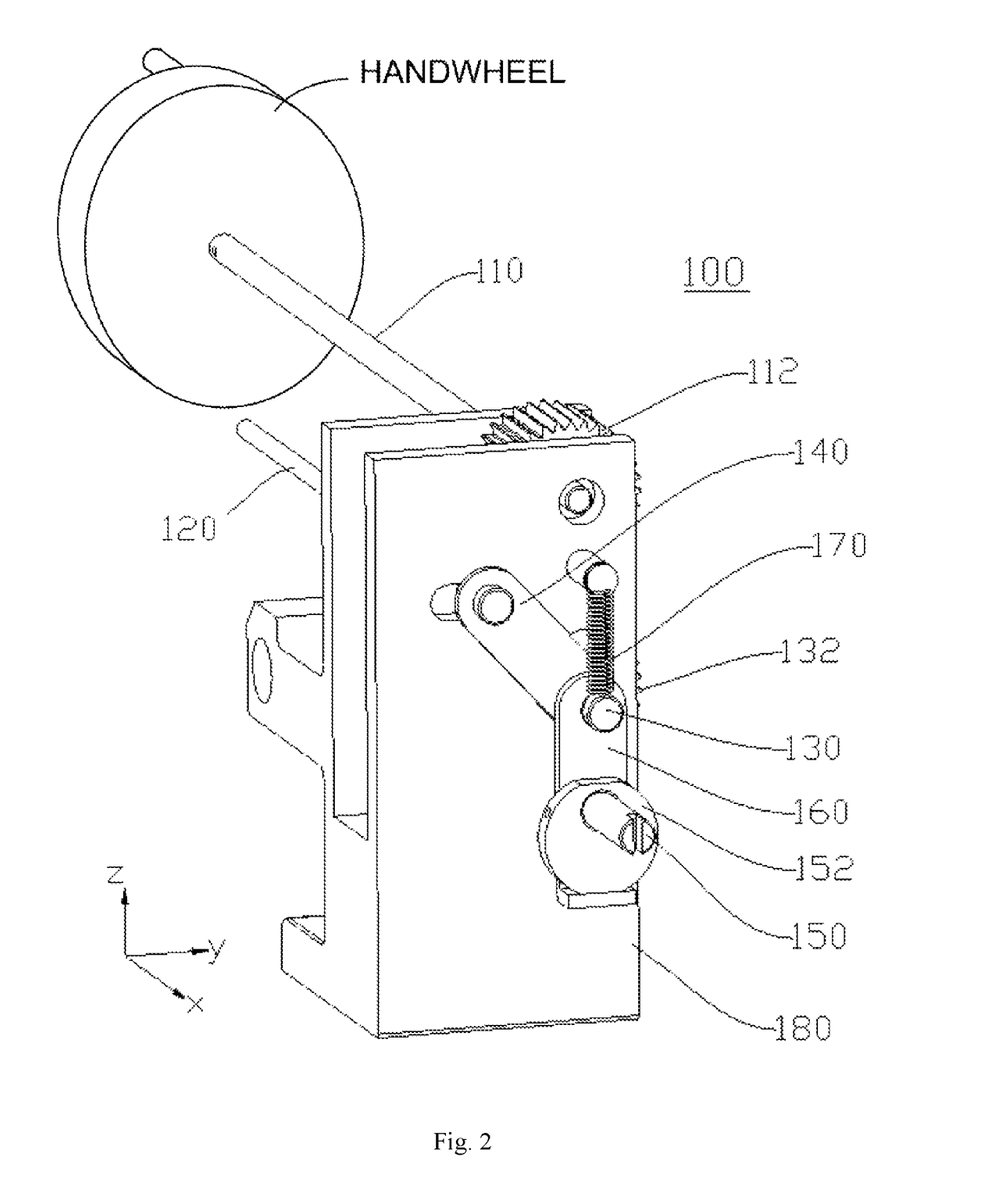
FIG. 2 is a perspective view of a rotating direction change device in a second meshing position according to one embodiment of the present disclosure.

FIG. 2 shows a perspective view of a rotating direction change device 100 in a second meshing position according to one embodiment of the present disclosure. The cam 152 is in the second cam position and the rotating direction change device 100 is correspondingly in the second meshing position.

Figure 3:
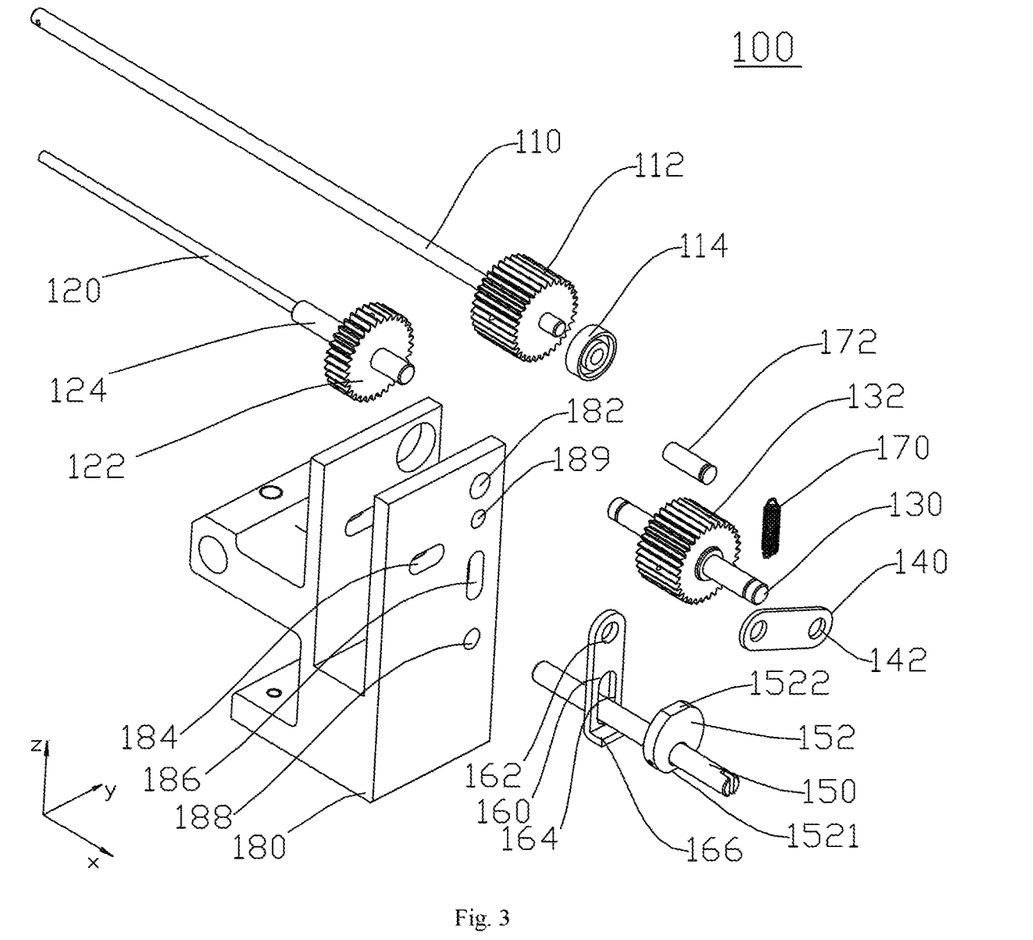
FIG. 3 is an exploded view of a rotating direction change device according to one embodiment of the present disclosure.

FIG. 3 shows an exploded view of a rotating direction change device 100 according to one embodiment of the present disclosure. The first connection part 140 is configured as a strip plate and defines two through holes 142. The two through holes 142 are fitted with the output shaft 120 and the intermediate shaft 130 respectively, such that the first connection part 140 is rotatable relative to the output shaft 120 and the intermediate shaft 130 respectively. The two through holes 142 are at a preset distance, such that the second gear wheel 122 and the third gear wheel 132 are constantly meshed.

The cam 152 is substantially configured as a circular plate and has a first engagement surface 1521 and a second engagement surface 1522 opposite to each other in a radial direction. A distance between the first engagement surface 1521 and the axis of the camshaft 150 is smaller than a distance between the second engagement surface 1522 and the axis of the camshaft 150. The second connection part 160 is configured as a strip plate and has a mounting hole 162 defined at the first end thereof, a flange 166 formed at the second end thereof, and an accommodating slot 164 defined between the mounting hole 162 and the flange 166 and extending along a length direction of the second connection part 160. The upper surface of the flange 166 is used to engage with the first engagement surface 1521 or the second engagement surface 1522 of the cam 152, thereby defining the first cam position and the second cam position of the cam 152, respectively. The mounting hole 162 is fitted with the intermediate shaft 130, such that the cam 152 can drive the intermediate shaft 130 to move. The camshaft 150 passes through the accommodating slot 164, such that when the cam 152 is converted between the first cam position and the second cam position, the second connection part 160 can move relative to the camshaft 150.

The base 180 has a first hole 182, a first slot 184, a second slot 186, and a second hole 188. The input shaft 110 is fitted in the first hole 182, such that the input shaft 110 may be mounted to the base 180 and the position thereof is fixed. The first slot 184 extends in the left-and-right direction, and the output shaft 120 is movably fitted in the first slot 184, such that the output shaft 120 can be mounted to the base 180 and movable in the left-and-right direction relative to the base 180. The second slot 186 extends in the up-and-down direction, and the intermediate shaft 130 is movably fitted in the second slot 186, such that the intermediate shaft 130 can be mounted to the base 180 and movable in the up-and-down direction relative to the base 180. The camshaft 150 is fitted in the second hole 188, such that the camshaft 150 can be mounted to the base 180 and the position thereof is fixed. In addition, the first hole 182, the second slot 186 and the second hole 188 are aligned in the up-and-down direction, and the second slot 186 is located between the first hole 182 and the second hole 188. It should be understood by those skilled in the related art that the first hole 182, the second slot 186 and the second hole 188 may also not be aligned in the up-and-down direction. For example, the second hole 188 is not aligned with the first hole 182 and the second slot 186 in the up-and-down direction, such that the length direction of the second connection part 160 and the up-down direction are at a certain angle.

The rotating direction change device 100 may also include a pin 172, and the position of the pin 172 is fixed. A first end of the elastic member 170 is fixedly connected to the pin 172. The base 180 has a blind hole 189. The pin 172 is fixedly fitted in the blind hole 189, such that the first end of the elastic member 170 is fixedly connected to the base 180 through the pin 172. In some embodiments, the pin 172 may be integrally formed with the base 180.

In some embodiments, the rotating direction change device 100 may also include a bearing 114. The input shaft 110 is fitted in the first hole 182 through the bearing 114 to ensure the rotation accuracy of the input shaft 110.

In some embodiments, the rotating direction change device 100 may also include a shaft sleeve 124. The shaft sleeve 124 is fixedly fitted over the output shaft 120, and the second gear wheel 122 is non-rotatably mounted to the output shaft 120 through the shaft sleeve 124. In this way, while the strength of the output shaft 120 is strengthened, connection between the first connection part 140 and the intermediate shaft 130 can be facilitated.

The working process of the rotating direction change device 100 according to one embodiment of the present disclosure is described below with reference to FIGS. 4-7.

Figure 4:
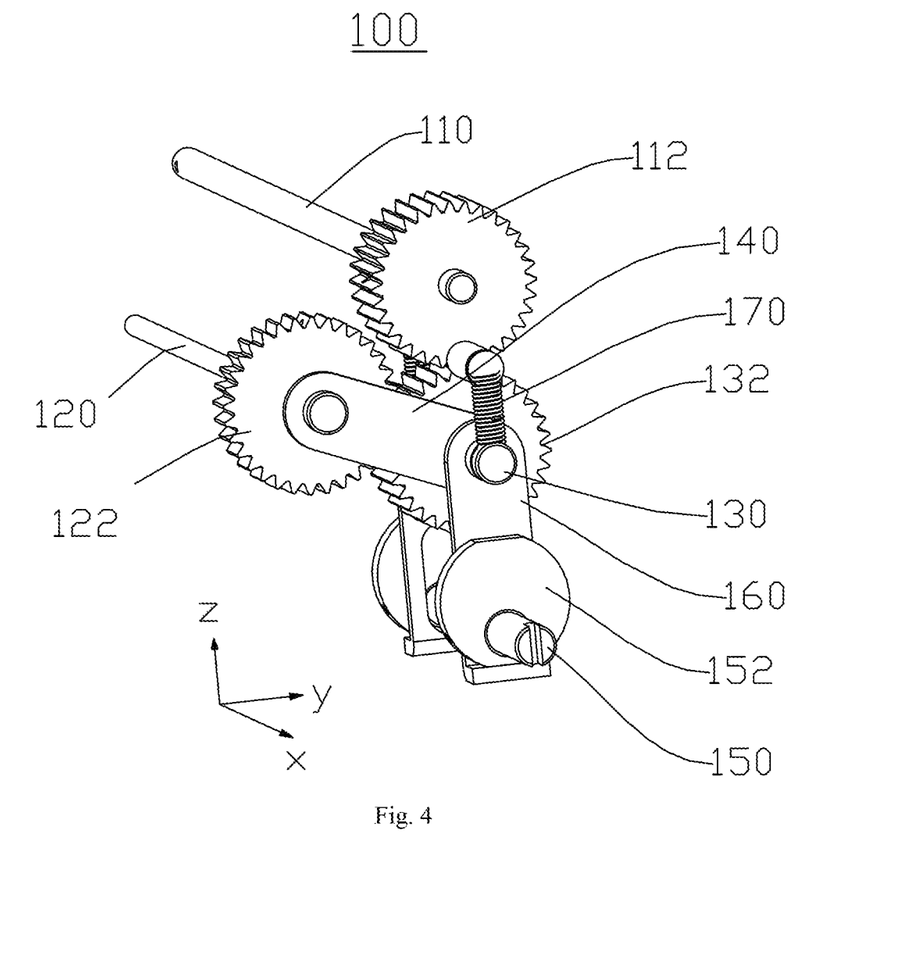
FIG. 4 is a perspective view of a rotating direction change device in a first meshing position according to one embodiment of the present disclosure where a base is removed.
Figure 5:
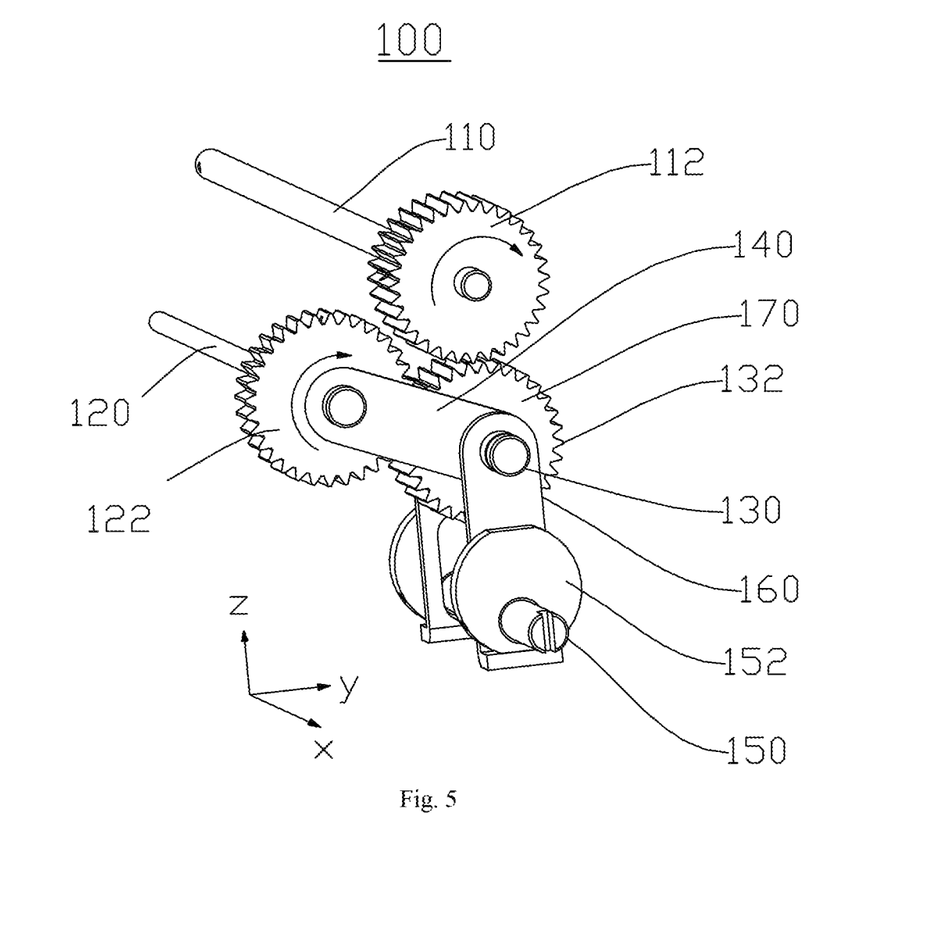
FIG. 5 is a perspective view of a rotating direction change device in a first meshing position according to one embodiment of the present disclosure where a base, an elastic member and a pin member are removed.

FIG. 4 shows a perspective view of the rotating direction change device 100 in the first meshing position according to one embodiment of the present disclosure where the base 180 is removed. FIG. 5 shows a perspective view of the rotating direction change device 100 in the first meshing position according to one embodiment of the present disclosure where the base 180, the elastic member 170, and the pin 172 are removed. When the rotating direction change device 100 is in the first meshing position, under the action of the elastic member 170, the first engagement surface 1521 of the cam 152 is engaged with an upper surface of the flange 166 of the second connection part 160. That is, the cam 152 is in the first cam position. The third gear wheel 132 is directly meshed with the first gear wheel 112, and the second gear wheel 122 is separated from the first gear wheel 112. Since the second gear wheel 122 is constantly meshed with the third gear wheel 132, the second gear wheel 122 is indirectly meshed with the first gear wheel 112 through the third gear wheel 132. Thus, when the input shaft 110 rotates clockwise in the direction illustrated in FIG. 5, the output shaft 120 rotates in the same direction.

When the cam 152 is rotated by a certain angle from the first cam position to the second cam position, a peripheral face of the cam 152 is engaged with the upper surface of the flange 166 of the second connection part 160, and a distance between the upper surface of the flange 166 of the second connection part 160 and an axis of the camshaft 150 increases gradually, such that the second connection part 160 moves downward relative to the camshaft 150. The intermediate shaft 130 is driven by the second connection part 160 to move downward along the second slot 186, such that the third gear wheel 132 is gradually separated from the first gear wheel 112, and the intermediate shaft 130 drives the output shaft 120 to move rightwards along the first slot 184 through the first connection part 140, such that the second gear wheel 122 is gradually close to the first gear wheel 112 until the second engagement surface 1522 of the cam 152 is engaged with the upper surface of the flange 166 of the second connection part 160. That is, the cam 152 is in the second cam position, such that the second gear wheel 122 is meshed with the first gear wheel 112, and thus, the rotating direction change device 100 is in the second meshing position.

Figure 6:
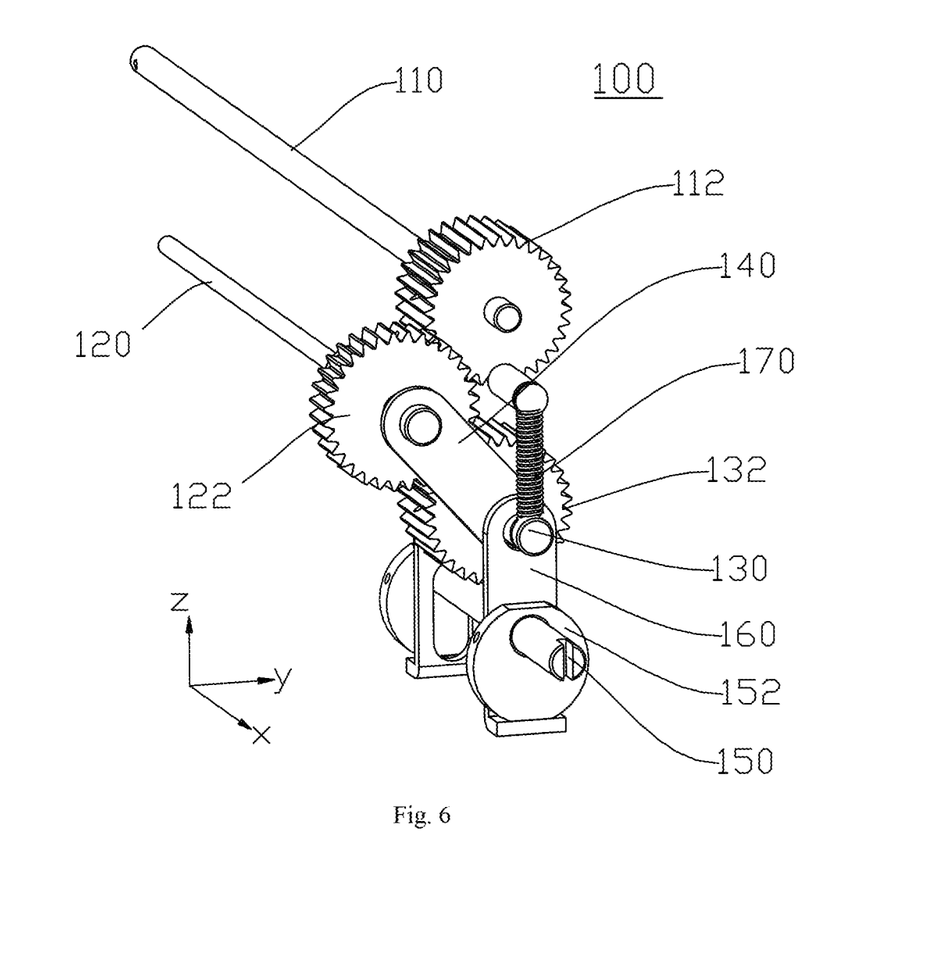
FIG. 6 is a perspective view of a rotating direction change device in a second meshing position according to one embodiment of the present disclosure where a base is removed.
Figure 7:
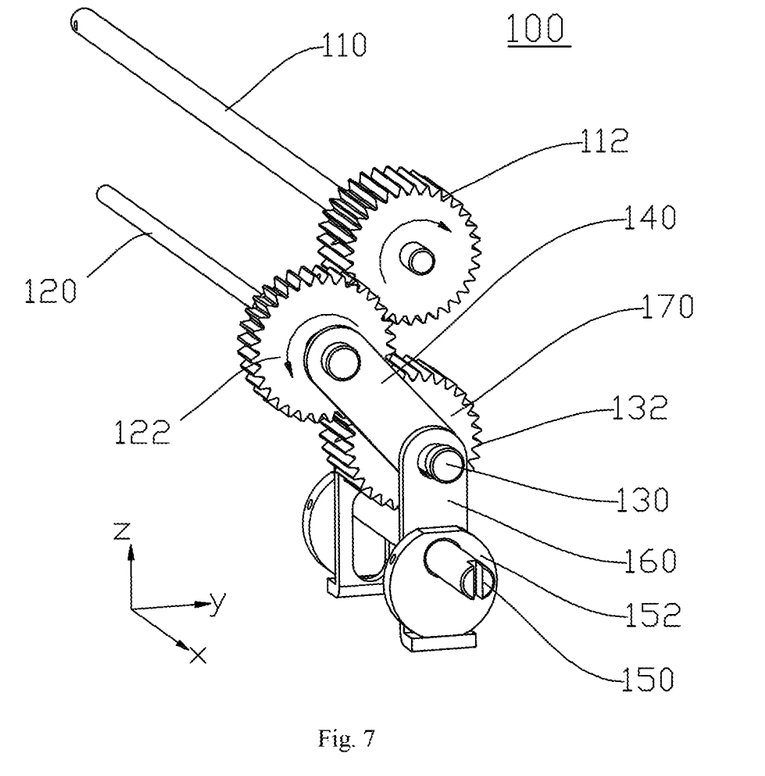
FIG. 7 is a perspective view of a rotating direction change device in a second meshing position according to one embodiment of the present disclosure where a base, an elastic member and a pin member are removed.

FIG. 6 shows a perspective view of the rotating direction change device 100 in the second meshing position according to one embodiment of the present disclosure where the base 180 is removed. FIG. 7 is a perspective view of the rotating direction change device 100 in the second meshing position according to one embodiment of the present disclosure where the base 180, the elastic member 170, and the pin 172 are removed. When the rotating direction change device 100 is in the second meshing position, under the action of the elastic member 170, the second engagement surface 1522 of the cam 152 is engaged with the upper surface of the flange 166 of the second connection part 160. The second gear wheel 122 is directly meshed with the first gear wheel 112, and the third gear wheel 132 is separated from the first gear wheel 112. Thus, when the input shaft 110 rotates clockwise in the direction illustrated in FIG. 7, the output shaft 120 rotates in the opposite direction.

When the cam 152 is rotated by a certain angle from the second cam position to the first cam position, the peripheral face of the cam 152 is engaged with the upper surface of the flange 166 of the second connection part 160, and the distance between the upper surface of the flange 166 of the second connection part 160 and the axis of the camshaft 150 is gradually reduced, such that the second connection part 160 moves upwards relative to the camshaft 150 under the action of the elastic member 170. The intermediate shaft 130 is driven by the second connection part 160 to move upwards along the second slot 186, such that the third gear wheel 132 is gradually close to the first gear wheel 112. The intermediate shaft 130 drives the output shaft 120 to move leftwards along the first slot 184 through the first connection part 140, such that the second gear wheel 122 is gradually separated from the first gear wheel 112, until the first engagement surface 1521 of the cam 152 is engaged with the upper surface of the flange 166 of the second connection part 160. That is, the cam 152 is in the first cam position, such that the third gear wheel 132 is directly meshed with the first gear wheel 112, and the second gear wheel 122 is indirectly meshed with the first gear wheel 112 through the third gear wheel 132, such that the rotating direction change device 100 is again in the first meshing position.

In addition, the rotating direction change device 100 according to one embodiment of the present disclosure may also include a handwheel connected to the input shaft 110. Thus, the input shaft 110 may be driven by the user through the handwheel directly or indirectly, and the output shaft 120 is used to generate the cutting feed action directly or indirectly. Thus, when the input shaft 110 is driven, and when the rotating direction change device 100 is in the first meshing position and the input shaft 110 rotates clockwise, or when the rotating direction change device 100 is in the second meshing position and the input shaft 110 rotates counterclockwise, the output shaft 120 rotates in the same direction. Therefore, the user may operate the handwheel to drive the input shaft 110 in different directions, such that the output shaft 120 rotates in the same direction, which makes the operation flexible and improves use comfort.

Therefore, the rotating direction change device 100 according to one embodiment of the present disclosure enables the rotating direction change device 100 to have two meshing positions, thereby changing the rotating direction. Moreover, the rotating direction change device 100 has the advantages of simple structure, low friction and small operation torque of the user.

A rotating direction change device 200 according to another embodiment of the present disclosure will be described below.

Figure 8:
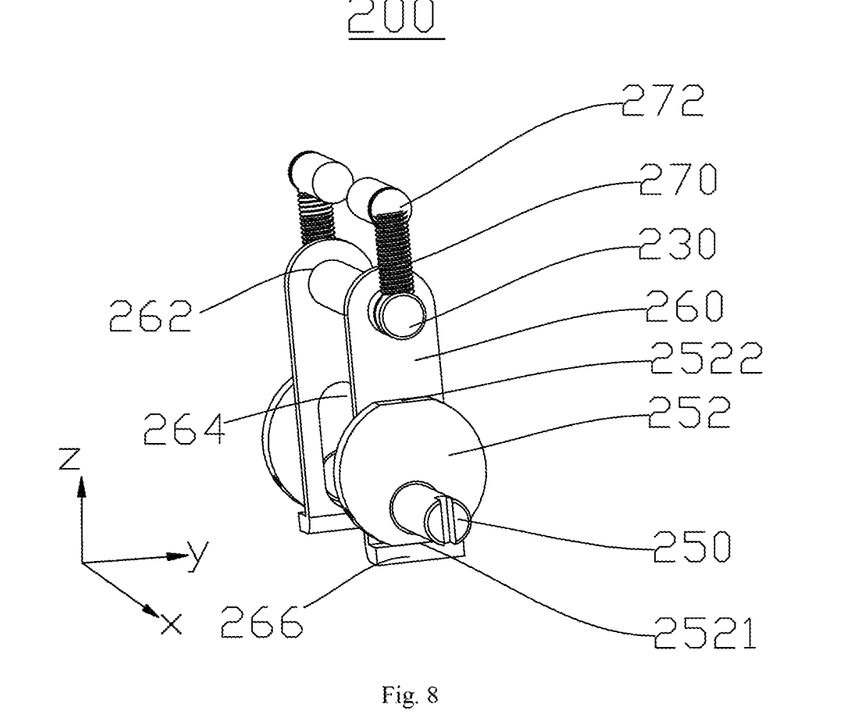
FIG. 8 is a perspective view of a rotating direction change device in a first rest position according to another embodiment of the present disclosure.
Figure 9:
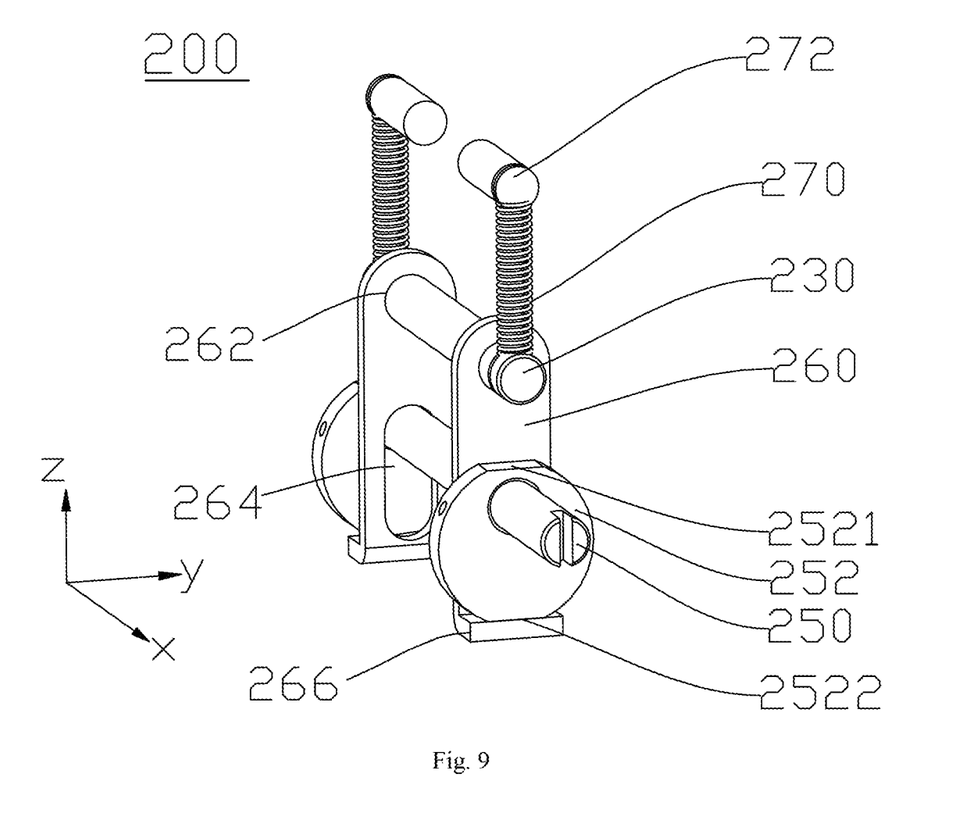
FIG. 9 is a perspective view of a rotating direction change device in a second rest position according to another embodiment of the present disclosure.

As illustrated in FIG. 8, the rotating direction change device 200 according to another embodiment of the present disclosure includes a rotating shaft 230, a camshaft 250, a cam 252, and a transmission part 260. The rotating shaft 230 may move linearly. As illustrated in FIG. 8, the rotating shaft 230 may move linearly in the up-and-down direction. A position of the camshaft 250 is fixed, and the cam 252 is non-rotatably mounted to the camshaft 250. The center of the cam 252 is offset from an axis of the camshaft 250. A first end of the transmission part 260 is connected to the rotating shaft 230, and a second end of the transmission part 260 is engaged with the cam 252. Thus, the cam 252 can drive the rotating shaft 230 to move linearly through the transmission part 260. The cam 252 has a first cam position and a second cam position. The first cam position and the second cam position may be switched to each other by rotating the cam 252 through a certain angle, such that the rotating direction change device 200 may be switched between the first rest position and the second rest position. As illustrated in FIG. 8, the cam 252 is in the first cam position, and the rotating direction change device 200 is correspondingly in the first rest position. As illustrated in FIG. 9, the cam 252 is in the second cam position, and the rotating direction change device 200 is correspondingly in the second rest position.

The cam 252 is configured as a circular plate, and has a first engagement surface 2521 and a second engagement surface 2522 opposite to each other in a radial direction, and a distance between the first engagement surface 2521 and the axis of the camshaft 250 is smaller than a distance between the second engagement surface 2522 and the axis of the camshaft 250. The transmission part 260 is configured as a strip plate, and has a mounting hole 262 defined at a first end thereof, a flange 266 formed at a second end thereof, and an accommodating slot 264 defined between the mounting hole 262 and the flange 266 and extending along a length direction of the transmission part 260. The upper surface of the flange 266 is used to engage with the first engagement surface 2521 or the second engagement surface 2522 of the cam 252, thereby defining the first cam position and the second cam position of the cam 252 respectively. The mounting hole 262 is fitted with the rotating shaft 230, and the camshaft 250 passes through the accommodating slot 264. Thus, when the cam 252 is converted between the first cam position and the second cam position, the transmission part 260 can move relative to the camshaft 250.

The rotating direction change device 200 may also include an elastic member 270. A position of a first end of the elastic member 270 is fixed, the second end of the elastic member 270 is connected to the rotating shaft 230, such that the elastic member 270 acts on the transmission part 260 and enables the second end of the transmission part 260 to be constantly engaged with the cam 252. That is, the cam 252 is maintained in the first cam position or the second cam position so as to prevent the cam 252 from accidentally moving and also to prevent the rotating shaft 230 from accidentally moving. Although the second end of the elastic member 270 illustrated in FIG. 8 is connected to the rotating shaft 230, it should be understood by those skilled in the related art that the second end of the elastic member 270 may also be connected to other positions. For example, the second end of the elastic member 270 may be connected to the first end of the transmission part 260.

The rotating direction change device 200 may also include a pin 272, the position of the pin 272 is fixed, and the first end of the elastic member 270 is fixedly connected to the pin 272.

The working process of the rotating direction change device 200 according to another embodiment of the present disclosure will be described below with reference to FIGS. 8 and 9.

FIG. 8 shows a perspective view of the rotating direction change device 200 in the first rest position according to another embodiment of the present disclosure. When the rotating direction change device 200 is in the first rest position, under the action of the elastic member 270, the first engagement surface 2521 of the cam 252 is engaged with the upper surface of the flange 266 of the transmission part 260. That is, the cam 252 is in the first cam position.

When the cam 252 is rotated by a certain angle from the first cam position to the second cam position, the peripheral face of the cam 252 is engaged with the upper surface of the flange 266 of the transmission part 260, and the distance between the upper surface of the flange 266 of the transmission part 260 and the axis of the camshaft 250 increases gradually, such that the transmission part 260 moves downward relative to the camshaft 250. The intermediate shaft 230 is driven by the transmission part 260 to move downwards, such that the rotating shaft 230 is gradually close to the camshaft 250 until the second engagement surface 2522 of the cam 252 is engaged with the upper surface of the flange 266 of the transmission part 260, That is, the cam 252 is in the second cam position, such that the rotating direction change device 200 is in the second rest position.

FIG. 9 shows a perspective view of the rotating direction change device 200 in the second rest position according to another embodiment of the present disclosure. When the rotating direction change device 200 is in the second rest position, the second engagement surface 2522 of the cam 252 is engaged with the upper surface of the flange 266 of the transmission part 260 under the action of the elastic member 270.

When the cam 252 is rotated by a certain angle from the second cam position to the first cam position, the peripheral face of the cam 252 is engaged with the upper surface of the flange 266 of the transmission part 260, and the distance between the upper surface of the flange 266 of the transmission part 260 and the axis of the camshaft 250 is gradually reduced. Under the action of the elastic part 270, the transmission part 260 moves upwards relative to the camshaft 250. The rotating shaft 230 is driven by the transmission part 260 to move upwards, such that the rotating shaft 230 is gradually away from the camshaft 250 until the first engagement surface 2521 of the cam 252 is engaged with the upper surface of the flange 266 of the transmission part 260. That is, the cam 252 is in the first cam position, such that the rotating direction change device 200 is again in the first rest position again.

As illustrated in FIG. 8 and FIG. 9, the rotating shaft 230, the camshaft 250, and the transmission part 260 are aligned in the up-and-down direction, such that the stress among the components may be simplified. In some embodiments, the rotating shaft 230 may be configured as an intermediate shaft 130 of the rotating direction change device 100 according to the above embodiment of the present disclosure. It should be understood by those skilled in the related art that the rotating shaft 230, the camshaft 250, and the transmission part 260 are not aligned in the up-and-down direction.

In addition, it should be understood by those skilled in the related art that the rotating shaft 230 may also be configured as the output shaft 120 of the rotating direction change device 100 according to the above embodiment of the present disclosure. Thus, the rotating shaft 230, the camshaft 250, and the transmission part 260 may be arranged in the left-and-right direction.

Other structures and principles of the rotating direction change device 200 according to another embodiment of the disclosure may refer to the rotating direction change device 100 according to the above embodiment of the disclosure, which will not be described herein.

In the rotating direction change device 200 according to one embodiment of the present disclosure, the camshaft 250 and the rotating shaft 230 are connected by using the transmission part 260, such that the cam 252 can drive the rotating shaft 230 to move linearly through the transmission part 260. Thus, user may operate the rotating direction change device 200 through the cam 252 and the operation torque of the user is small.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, the term "a plurality of" means two or more than two, unless specified otherwise.

In the present disclosure, unless specified or limited otherwise, the terms "mounted," "connected," "coupled" "fixed" or the like are used broadly. The terms may indicate, for example, fixed connections, detachable connections, or integral connections, may also indicate mechanical or electrical connections or mutual communication, may also indicate direct connections or indirect connections via intermediate mediums, and may also indicate inner communications of two elements or the interaction between two elements. The specific meanings of the terms in embodiments of the present disclosure may be understood by those skilled in the art according to particular circumstances.

In the descriptions of the present disclosure, it should be noted that, unless otherwise expressly specified and limited, the first feature "on" or "under" the second feature may be that the first and second features are in direct contact, or that the first and second features are in indirect contact through an intermediate medium. Moreover, the first feature "up", "above" and "on" the second feature may be that the first feature is directly above or obliquely above the second feature, or merely be that the first feature has a level higher than the second feature. The first feature "down", "below" and "under" the second feature may be that the first feature is directly below or obliquely below the second feature, or merely be that the first feature has a level less than the second feature.

Reference throughout this specification to terms "an embodiment," "some embodiments," "an example", "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

Although embodiments of the present disclosure have been illustrated and described above, it should be understood that the above embodiments are illustrative and cannot be construed to limit the present disclosure, and that those skilled in the art may change, modify, alternate and vary the above embodiments within the scope of the present disclosure.

What claimed is:

1. A rotating direction change device for a microtome, comprising:
   a first shaft arranged in a first fixed position;
   a first gear wheel non-rotatably mounted to the first shaft;
   a second shaft movable in a first direction;
   a second gear wheel non-rotatably mounted to the second shaft;
   a third shaft movable in a second direction;
   a third gear wheel non-rotatably mounted to the third shaft; and
   a first connection part connecting the second shaft and the third shaft such that the second gear wheel is constantly meshed with the third gear wheel,
   wherein the second gear wheel is driven by the first gear wheel directly or indirectly; and
   wherein the first direction is perpendicular to the second direction.

2. The rotating direction change device according to claim 1, wherein the rotating direction change device has a first meshing position and a second meshing position, when in the first meshing position, the third gear wheel is directly meshed with the first gear wheel, the second gear wheel is indirectly meshed with the first gear wheel through the third gear wheel; when in the second meshing position, the third gear wheel is separated from the first gear wheel, and the second gear wheel is directly meshed with the first gear wheel.

3. The rotating direction change device according to claim 1, wherein the first connection part is configured as a strip plate, two through holes are defined in the first connection part and fitted with the second shaft and the third shaft respectively, and the two through holes are at a preset distance such that the second gear wheel is constantly meshed with the third gear wheel.

4. The rotating direction change device according to claim 1, further comprising a base, the base defining a first hole, a first slot and a second slot, wherein the first shaft is fitted in the first hole, the first slot extends in the first direction, the second shaft is movably fitted in the first slot, the second slot extends in the second direction and the third shaft is movably fitted in the second slot.

5. The rotating direction change device according to claim 4, further comprising a bearing, wherein the first shaft is fitted in the first hole of the base through the bearing.

6. The rotating direction change device according to claim 1, further comprising a shaft sleeve fixedly fitted over the second shaft, wherein the second gear wheel is non-rotatably mounted to the second shaft through the shaft sleeve.

7. The rotating direction change device according to claim 1, further comprising a handwheel connected to the first shaft.

8. The rotating direction change device according to claim 1, further comprising:
   a camshaft arranged in a second fixed position;
   a cam non-rotatably mounted to the camshaft, a center of the cam being offset from an axis of the camshaft; and
   a second connection part having a first end connected to the third shaft, and a second end engaged with the cam,
   wherein the cam drives the third shaft to move in the second direction through the second connection part.

9. The rotating direction change device according to claim 8, wherein the cam is configured as a circular plate, and has a first engagement surface and a second engagement surface opposite to each other in a radial direction, and a distance between the first engagement surface and the axis of the camshaft is smaller than a distance between the second engagement surface and the axis of the camshaft.

10. The rotating direction change device according to claim 9, wherein the second connection part is configured as a strip plate, and has a mounting hole defined in a first end thereof, a flange formed at a second end thereof, and an accommodating slot defined between the mounting hole and the flange and extending in a length direction of the second connection part; an upper surface of the flange is configured to engage with the first engagement surface or the second engagement surface of the cam, the mounted hole is fitted with the third shaft, and the camshaft passes through the accommodating slot.

11. The rotating direction change device according to claim 8, further comprising a base having a second hole therein, wherein the camshaft is fitted in the second hole.

12. The rotating direction change device according to claim 8, further comprising an elastic member having a first end arranged in a third fixed position, and a second end connected to the third shaft or connected to the first end of the second connection part.

13. The rotating direction change device according to claim 12, further comprising:
   a pin arranged in the third fixed position, wherein the first end of the elastic member is fixed to the pin.

14. A rotating direction change device for a microtome, comprising:
   a first shaft arranged in a first fixed position;
   a first gear wheel non-rotatably mounted to the first shaft;
   a second shaft movable in a first direction;
   a second gear wheel non-rotatably mounted to the second shaft;
   a third shaft movable in a second direction;
   a third gear wheel non-rotatably mounted to the third shaft; and
   a first connection part connecting the second shaft and the third shaft such that the second gear wheel is constantly meshed with the third gear wheel,
   wherein the second gear wheel is driven by the first gear wheel directly or indirectly; and wherein the rotating direction change device has a first meshing position and a second meshing position, when in the first meshing position, the third gear wheel is directly meshed with the first gear wheel, the second gear wheel is indirectly meshed with the first gear wheel through the third gear wheel; when in the second meshing position, the third gear wheel is separated from the first gear wheel, and the second gear wheel is directly meshed with the first gear wheel.

15. A rotating direction change device for a microtome, comprising:
   a first shaft arranged in a first fixed position;
   a first gear wheel non-rotatably mounted to the first shaft;
   a second shaft movable in a first direction;
   a second gear wheel non-rotatably mounted to the second shaft;
   a third shaft movable in a second direction;
   a third gear wheel non-rotatably mounted to the third shaft; and
   a first connection part connecting the second shaft and the third shaft such that the second gear wheel is constantly meshed with the third gear wheel,
   wherein the second gear wheel is driven by the first gear wheel directly or indirectly; and
   further comprising a base, the base defining a first hole, a first slot and a second slot, wherein the first shaft is fitted in the first hole, the first slot extends in the first direction, the second shaft is movably fitted in the first slot, the second slot extends in the second direction and the third shaft is movably fitted in the second slot.

* * * * *